United States Patent [19]

Watson

[11] Patent Number: 4,944,670

[45] Date of Patent: Jul. 31, 1990

[54] SELF-CLEANING BURNER

[75] Inventor: James E. Watson, Southgate, Mich.

[73] Assignee: North American Manufacturing Co., Cleveland, Ohio

[21] Appl. No.: 451,784

[22] Filed: Dec. 15, 1989

[51] Int. Cl.$^5$ ............................................. F23D 11/44
[52] U.S. Cl. ...................................... 431/166; 165/5; 431/170; 432/180; 432/181
[58] Field of Search .................. 431/170, 166; 432/28, 432/180, 181, 182; 266/139, 140; 165/5

[56] References Cited

U.S. PATENT DOCUMENTS

| | | | |
|---|---|---|---|
| 4,299,561 | 11/1981 | Stokes | 432/28 |
| 4,444,128 | 4/1984 | Monro | 165/5 X |
| 4,604,051 | 8/1986 | Davies et al. | 431/166 |
| 4,838,782 | 6/1989 | Wills | 431/166 |
| 4,840,560 | 6/1989 | Waddington | 432/180 X |
| 4,874,311 | 10/1989 | Gitman | 432/181 X |

Primary Examiner—Edward G. Favors
Attorney, Agent, or Firm—Woodling, Krost & Rust

[57] ABSTRACT

A regenerative bed is operated in a separate, additional cleaning cycle by heating the regenerative bed media to a temperature above the condensation temperature of contaminants in order to liquify and drain of the same off of the bed media. In the preferred embodiment shown, this is accomplished by over riding the normal cycling of the regenerative beds so as to retain a subject bed in a fluing mode for an abnormal amount of time (trading bed efficiency for the heating of the bed). The beds preferably also incorporate an escape opening 13 to drain off the contaminants.

7 Claims, 4 Drawing Sheets

SELF-CLEANING BURNER

The present invention relates to an improvement for direct fire regenerative bed burners utilized in contaminant-prone environments.

Direct fire regenerative burners are devices utilized to heat the atmosphere surrounding materials so as to transfer the heat to the material. The regenerative burners themselves can be integral (where the regenerative bed is contained within the burner), or it can be separated (in which case the regenerative bed is displaced some distance from the burner). The regenerative burners operate by cycling alternately between burner and flue modes at various intervals to provide heat for the furnace with which the burner is utilized.

The regenerative bed burners are very functional in this operation. However, a problem exists under certain applications of direct fire regenerative beds where contaminants build up within the regenerative bed. This occurs primarily due to the condensing and solidifying effect which is present as a result of the temperature differential which exists between the top of the bed closest to the entrance of the regenerative bed (burner side—hotter) and that section of the bed which is displaced from the entrance to the regenerative bed (flue side—cooler). An example of this would be an aluminum furnace where the aluminum salts condense in the regenerative bed such that it is necessary to tear down the regenerative bed in order to remove the condensed salts. This operation may necessitate shutting down the furnace to clean the regenerative bed, but it also involves removal, cleaning, and replacement of the regenerative bed media. This operation significantly affects the productivity of the furnaces which incorporate the regenerative burners.

SUMMARY OF THE INVENTION

The invention of this application is directed to improving the operation of regenerative bed burners.

It is an object of this invention to improve the efficiency of regenerative burners in contaminant-prone environments.

It is object of this invention to reduce the maintenance time for the beds of regenerative burners.

Other objects and a more complete understanding of this invention may be had by referring to the following specifications and drawings in which:

DETAILED DESCRIPTION

Figure 4:
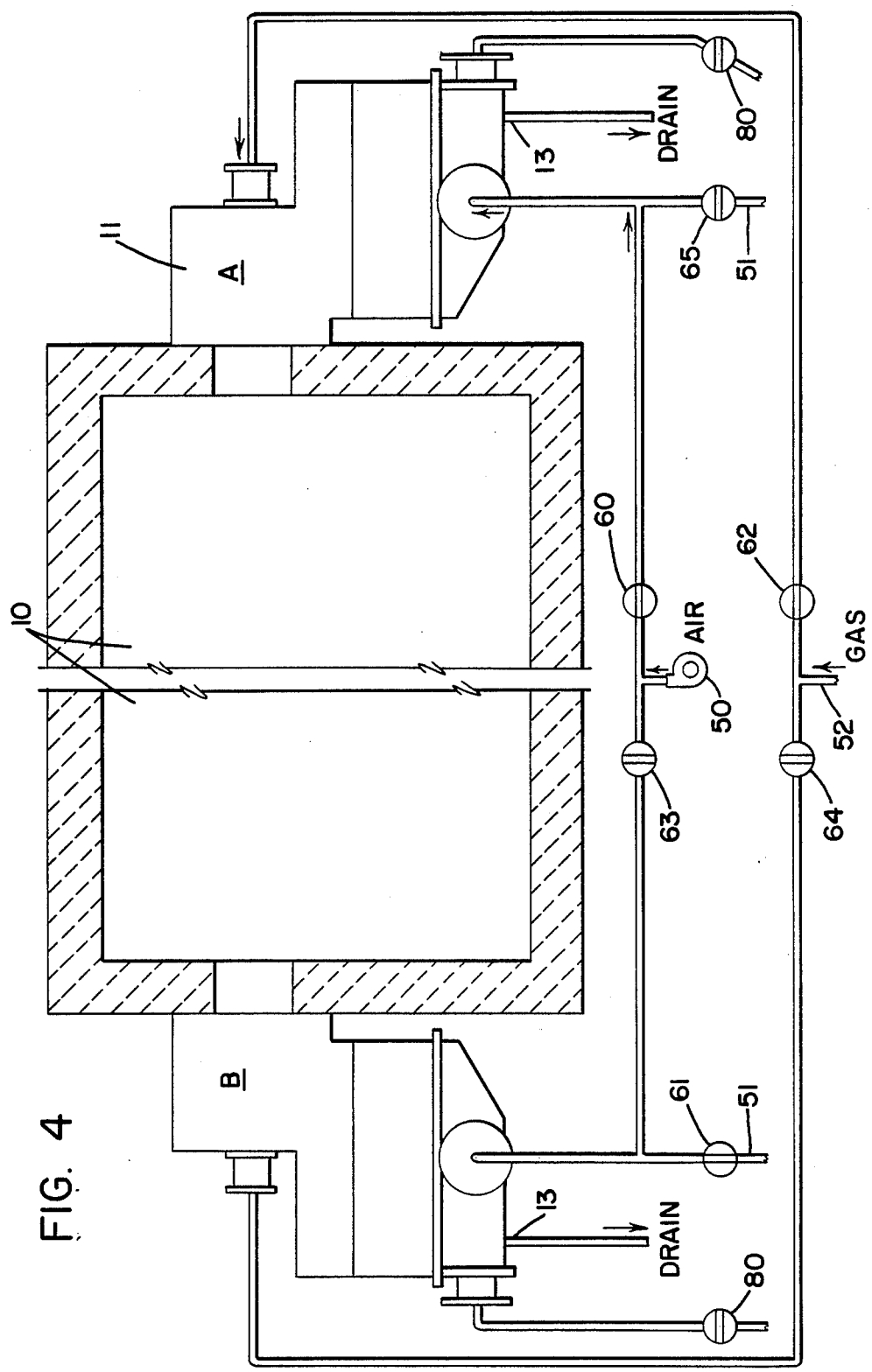

The preferred embodiment of the invention will be described in the environment of an aluminum reheat furnace 10 heated by a series of integral regenerative bed burners 11 (FIG. 4).

The furnace 10 is designed to contain the material being heated in respect to the burners 11. The material can be solid, fluidic, or otherwise. In the preferred embodiment shown and described, the furnace 10 is designed to heat a solid mass of aluminum in a melting chamber bath via direct flame heat. This furnace 10 is built of refractory brick. The aluminum to be heated is placed within this furnace 10 located in proximity to the burners 11 to be heated thereby. Other types of containers and/or materials could be utilized if desired.

The furnace 10 is heated by the burners 11. In the embodiment shown, these burners 11 are 500,000 BTU regenerative burners. These burners 11 are selectively connected to a source of combustion air 50, an exhaust 51 and gas 52 for alternate firing and exhaust. In the embodiment shown, there is a first mode wherein an active burner A would be connected to the source of combustion air 50 and gas 52 via the valves 60 and 62 respectively with an inactive burner B connected to the exhaust 51 via the valve 61, and a second mode with the active burner B connected to the source of combustion air 50 and gas 52 by the valves 63 and 64 respectively with the now inactive burner A connected to the exhaust 51 via the valve 65. Note that the actual valving is not critical to the operation of the invention; combined double pole or other types of valving could also be utilized with the invention. In the preferred embodiment the normal production cycles are for about 20 seconds each, firing and fluing.

Figure 3:
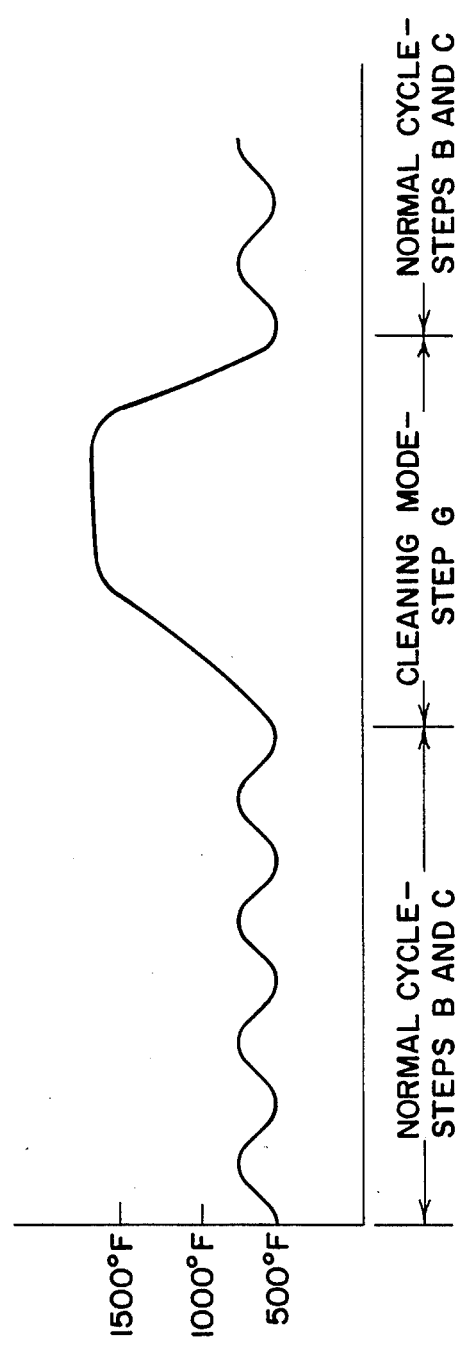
FIG. 3 is a graph of the temperature swings at the bottom of the regenerative bed media during normal production cycle and cleaning mode the operation of a regenerative bed in a furnace incorporating the invention; and, FIG. 4 is a furnace including burners with integral regenerative beds incorporating the invention.

If the burners A and B shown were operated in a customary manner, the top of the regenerative bed would have a temperature of about 2,000° F. with the bottom of the regenerative bed having a temperature fluctuating about 600° F. for the normal fluing cycle of the regenerative bed (normal cycle steps B and C in FIG. 3). This temperature distribution allows one to obtain an optimum coefficient of efficiency for the particular regenerative bed and burner being disclosed and re-utilize otherwise lost waste heat. The problem with this particular temperature distribution within the regenerative bed is that there exists a zone 75 within the bed that ranges in temperature below approximately 1600° F. This area (primarily that from 1600° to 1100°) comprises a plugging zone wherein the salts from the aluminum being heated in the furnace condense onto the bed media of the regenerative bed. This reduces the operational efficiency of the regenerative bed by various degrees increasing over time. The ordinary treatment for this plugging zone is for an operator to wait until the regenerative beds are sufficiently plugged that further operation of the furnace can not proceed under acceptable production conditions. The operator then shuts down the regenerative beds and physically cleans the bed media in the plugging zone. This operation is inefficient both for the necessity for shutting down the furnace, and for the physical problems inherent in opening up and cleaning the regenerative bed.

In the invention of this present application, each regenerative bed is operated in a separate, additional cleaning cycle. In this cleaning cycle, the regenerative bed media is heated to a temperature above the condensation temperature of the contaminants in order to liquify and drain of the same off of the bed media. In the preferred embodiment shown, the bed is heated by over riding the normal cycling of the regenerative beds so as to retain a subject bed in a fluing mode for an abnormal amount of time (trading bed efficiency for the heating of the bed). The beds preferably also incorporate an escape opening 13 to drain off the contaminants. It is preferred that this cleaning cycle occur with the flue gas discharging through a bypass eductor 80 (or separate exhaust leg) bypassing the customary exhaust 51 (which may not be designed to handle the heat).

Figure 1:
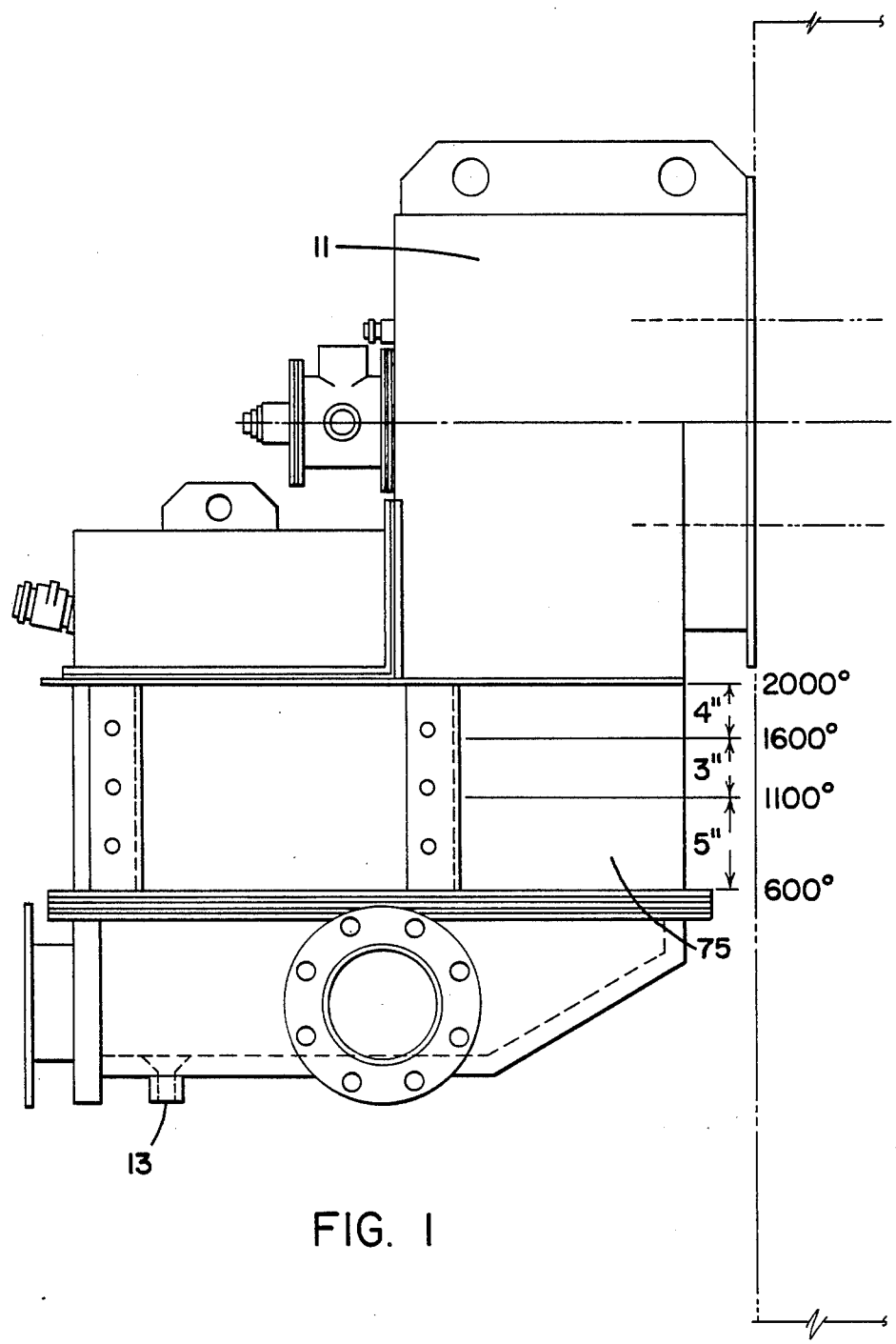
FIG. 1 is a lateral side view of a regenerative burner incorporating an integral regenerative bed.
Figure 2:
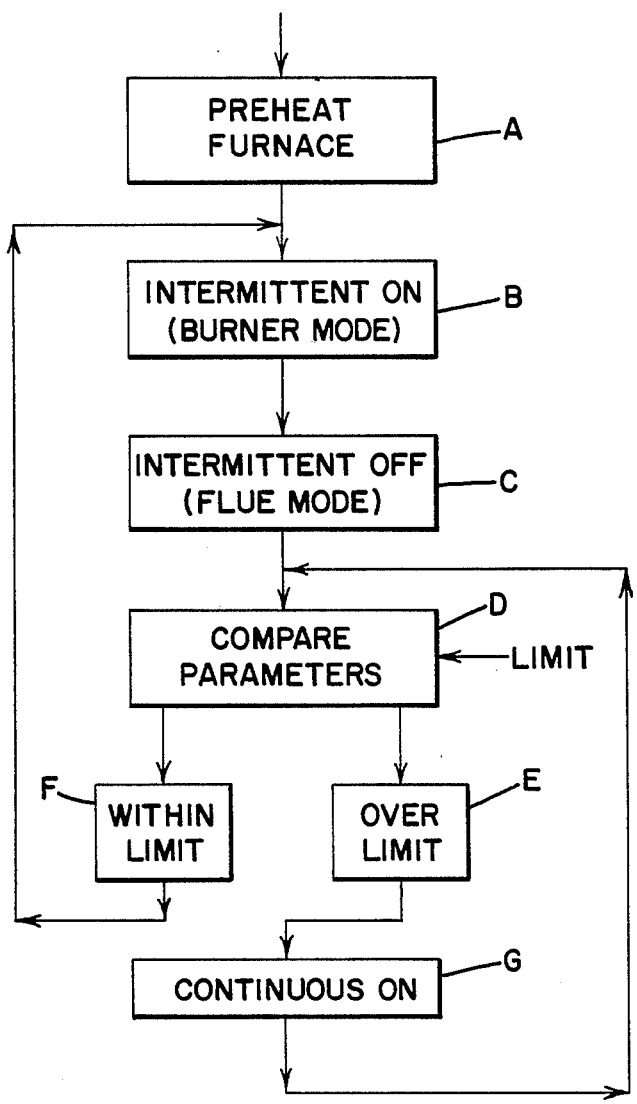
FIG. 2 is a flow chart diagrammatically depicting the operation of a furnace incorporating the invention of the application.

To operate the burner in accord with the invention, the operator utilizes the burner in a customary manner during preheat (step A in FIG. 2) and intermittent production operation (steps B and C in FIG. 2 and FIG. 3). In the particular embodiment shown, this production operation alternates burners A and B with 20 second firing and 20 second fluing cycles with the temperature of the bottom of the regenerative bed cycling approximately 600° F. (FIG. 3). During this production operation, the operating parameters of the regenerative beds are compared to allowable limits (step D in FIG. 2—the limits having been previously determined to optimize the operational effectiveness of the furnace) until it is determined, through physical measurements or otherwise, that there is a certain degree of loss of efficiency in the regenerative bed due to the bed becoming slightly plugged [due to the condensation of materials within the bed media] (step E in FIG. 2). Up until this point, the regenerative burner is operated without any special considerations (recycling back to step B through step F in FIG. 2). When it is determined that a sufficient amount of plugging has occurred within the bed media of the subject regenerative burner, the regenerative bed is then continuously operated in its flue mode (step G in FIG. 2 and FIG. 3) and, in the preferred embodiment shown, the bypass eductor 80 opened directly to the pollution control or chimney for the furnace (bypassing the customary exhaust 51). At this time the particular regenerative burner is continually run in a flue mode until the temperature at the bottom of the regenerative bed is raised sufficiently that the materials which are within the bed are all heated above the solidifying temperature for such materials (cycling through steps D, E, and G in FIG. 2). In the preferred embodiment, this temperature at the bottom of the fluing bed would be approximately 1600° F. for ten to twenty-five minutes (FIG. 3). After this time, all of the salts which have been previously plugging the bed media are liquified to drain out of the salt escape opening 13 in the bottom of the regenerative bed. When it is determined that a sufficient quantity of salts or plugging material has been removed from the regenerative bed, the particular burner is then switched again into ordinary operation again by closing the bypass educator 80 and the salt-escape opening 13 (step F in FIG. 2), and returning the regenerative burner back to its automatic cycling mode (step B of FIG. 2). This procedure is accomplished with the remainder of the effected burners in the furnace 10 until each of the effected burners is again operating back within the parameters designed for said regenerative burners. Note that in this cleaning cycle, the type of measurement or parameter and the limit for completion of the cleaning cycle may be different than the type of measurement or parameter and the limit for initiation of the cleaning cycle. For example the cleaning cycle may be initiated on a differential measurement of the pressure drop across the regenerative bed while the cleaning cycle may be terminated by the temperature of the bottom of the regenerative bed reaching a certain limit. The choice of parameter and limit thus could be chosen to fit the particular application. In addition the cleaning cycle could be otherwise be made less costly—for example, the measurements on one regenerative bed could determine the cleaning mode of every regenerative bed.

In this cleaning operation it is preferred that the regenerative burners be handled individually so as to allow the company to maintain the normal production utilization of the regenerative beds with as many burners as possible during the operation of the furnace 10. Alternately, each and every burner can be routinely cycled through the self-cleaning step automatically based on the mere passage of time (with the time preferably determined through experimentation so as to minimize any inefficiencies), and thus trade a slight reduction in regenerative burner efficiency in exchange for the knowledge that the burners are operating at a high unplugged rate, or the burners operated in a manner to compromise production (i.e. all burners on the left hand side firing, beds on the right fluing), or other modifications made to suit a particular application in a cost effective manner.

The graph of FIG. 3 sets forth the temperature swings that could be expected in a regenerative bed operated in accord with the invention. A preheat cycle (not shown) brings the furnace to operating temperature (of approximately 600° F. at the bottom of the regenerative bed). The normal operation cycle takes the bed through its burner/flue temperature swings, with each successive swing showing the effects of the plugging of the bed both by reducing the extent of the swing and the efficiency of the heat transfer. When these swings are deemed inadequate, the cleaning cycle is initiated and the bed superheated. When the bed is clean, the normal operation begins anew until the swing once again is deemed inadequate.

Although the invention has been described in its preferred embodiment, utilizing an integral regenerative bed with a certain degree of particularity, it is to be understood that numerous changes may be made without deviating from the invention as hereinafter claimed.

What is claimed is:

1. In a burner having a regenerative bed, which regenerative bed is prone to the solidification of contaminants from the material being heated within the furnace due to the existence within the regenerative bed of bed media having a temperature lower than the solidifying temperature of such contaminant material, the improvement comprising means to heat the bed media in the regenerative bed to above the solidifying temperature of the contaminants such that the contaminants are unsolidified and means to drain off the unsolidified contaminants from the regenerative bed.

2. The improved burner of claim 1 wherein the contaminants are aluminum salts having a solidifying temperature of approximately 1600° to 1100° F.

3. The improved regenerative bed of claim 1 characterized by the addition of a bypass eductor and means to operate the furnace and the bypass eductor so as to increase the temperature within the regenerative bed to above the solidifying temperature of the contaminant material.

4. The improved regenerative bed of claim 1 wherein there is a burner associated with the regenerative bed, which burner has a normal operating cycle and additionally comprising said means to raise the temperature of the regenerative bed above the solidifying temperature of the contaminants including interrupting the ordinary operating cycle of the burner of the regenerative bed so as to leave such burner in a quiescent state for a longer period than otherwise.

5. In a regenerative bed burner having a bed media on which material contaminants solidify based on the bed media having a surface temperature lower than the solidifying temperature of the contaminant material, and with the burner associated with the regenerative bed having selectively operated on and off cycles, the improvement comprising means to retain the burner associated with the regenerative bed in its flue mode, and means to heat the regenerative bed to above the solidifying temperature of the contaminant material such that the contaminant material drains off the bed media of the regenerative bed, and means to drain such unsolidified material from the regenerative bed.

6. The improved invention of claim 5 wherein means to drain said unsolidified contaminant material from the regenerative bed includes a drain valve.

7. The improved regenerative bed of claim 5 wherein said means to heat said regenerative bed above the solidifying temperature of the contaminant material includes a bypass eductor and said bypass eductor being selectively operated so as to draw increasing amounts of heated flue gas through the regenerative bed so as to reheat regenerative bed above the solidifying temperature of the contaminant material.

* * * * *